US012682707B2

(12) United States Patent
Saleh et al.

(10) Patent No.: US 12,682,707 B2
(45) Date of Patent: Jul. 14, 2026

(54) SMART KEY BATTERY POWER MANAGEMENT AND SENSING

(71) Applicant: FCA US LLC, Auburn Hills, MI (US)

(72) Inventors: Ahmad N Saleh, Rochester, MI (US); Ansaf I Alrabady, Livonia, MI (US)

(73) Assignee: FCA US LLC, Auburn Hills, MI (US)

( * ) Notice: Subject to any disclaimer, the term of this patent is extended or adjusted under 35 U.S.C. 154(b) by 161 days.

(21) Appl. No.: 18/619,274

(22) Filed: Mar. 28, 2024

(65) Prior Publication Data

US 2025/0308306 A1 Oct. 2, 2025

(51) Int. Cl.
*G07C 9/00* (2020.01)

(52) U.S. Cl.
CPC ..... *G07C 9/00896* (2013.01); *G07C 9/00309* (2013.01); *G07C 2009/00507* (2013.01); *G07C 2009/00769* (2013.01); *G07C 2209/02* (2013.01)

(58) Field of Classification Search
None
See application file for complete search history.

(56) References Cited

U.S. PATENT DOCUMENTS 10,538,220 B1 * 1/2020 Tyagi .................... B60R 25/245
2020/0339066 A1 * 10/2020 Park ...................... B60R 25/245
2022/0371549 A1 * 11/2022 Park ...................... B60R 25/245

FOREIGN PATENT DOCUMENTS

KR 20220157252 A * 11/2022 ........... B60R 25/102
KR 20230006340 A * 1/2023 ........... B60R 25/406
KR 20230158826 A * 11/2023 ............ B60R 25/24

* cited by examiner

*Primary Examiner* — K. Wong
(74) *Attorney, Agent, or Firm* — Jeremy J. Klobucar

(57) ABSTRACT

A vehicle control system to manage keyless entry functionality and communication of a vehicle includes a wireless control module (WCM) configured to be disposed within the vehicle and control one or more keyless entry functions, and a vehicle access device (VAD) to provide keyless entry functionality to a user. The VAD includes a battery powering a wireless communication device (WCD) for communicating with the WCM. The VAD includes a battery saving function configured to selectively deactivate the WCD to preserve battery power when no motion of the VAD is detected for a predetermined period of time. A controller having one or more processors is programmed to detect a presence of the VAD within a predetermined range of the vehicle, and selectively send a signal to the VAD to disable the battery saving function when the VAD is within the predetermined range of the vehicle.

16 Claims, 6 Drawing Sheets

200

| Key ID (202) | Previous Zone ID (204) | Current Zone ID (206) | Profile ID (208) |
|---|---|---|---|
| 00 | | | |
| 01 | | | |
| 02 | | | |
| - | | | |
| 100 | | | |

210

| ID (212) | Zone (214) |
|---|---|
| 0 | No Zone |
| 1 | Detection Zone, Exterior Right |
| 2 | Detection Zone, Exterior Left |
| 3 | Detection Zone, Exterior Rear |
| 4 | Access Zone, Exterior Right |
| 5 | Access Zone, Exterior Left |
| 6 | Access Zone, Exterior Rear |
| 7 | Interior |
| 8-15 | Reserved for future use |

220

| ID (222) | Access Profile (224) | Description (226) |
|---|---|---|
| 0 | Full | No Drive Restrictions |
| 1 | Access Only | Access only (No Drive permissions) |
| 2 | Car Delivery | Access only (No Drive permissions) |
| 3 | Valet | Valet Parking |
| 4-15 | Reserved for future use | -- |

FIG. 4

SMART KEY BATTERY POWER MANAGEMENT AND SENSING

FIELD

The present application generally relates to vehicle passive entry systems and, more particularly, to passive entry system power management and sensing.

BACKGROUND

Many vehicles include passive entry systems that allow a user to enter and start the vehicle without a key, simply requiring the driver to carry a key fob. The systems are referred to as 'passive' because they do not require any action from the user. However, because many key fobs cannot be charged, battery life is a major concern, particularly when newer features are added that require additional power. Additionally, some vehicles include digital key technology to enable a smartphone to function as a key for a vehicle. However, such alternative vehicle access devices often require additional hardware, which increases system complexity. Accordingly, while conventional passive entry systems work well for their intended purpose, there exists an opportunity for improvement in the relevant art.

SUMMARY

In accordance with one example aspect of the invention, a vehicle control system to manage keyless entry functionality and communication of a vehicle is provided. In one example implementation, the vehicle control system includes a wireless control module (WCM) configured to be disposed within the vehicle and control one or more keyless entry functions, and a vehicle access device (VAD) to provide keyless entry functionality to a user. The VAD includes a battery powering a wireless communication device (WCD) for communicating with the WCM. The VAD includes a battery saving function configured to selectively deactivate the WCD to preserve battery power when no motion of the VAD is detected for a predetermined period of time. A controller having one or more processors is programmed to detect a presence of the VAD within a predetermined range of the vehicle, and selectively send a signal to the VAD to disable the battery saving function when the VAD is within the predetermined range of the vehicle.

In addition to the foregoing, the described vehicle control system may include one or more of the following features: wherein the battery saving function is disabled to prevent an unintended deactivation of the WCD and thus the keyless entry functionality when the VAD is within an interior of the vehicle; wherein the VAD is a key fob with near field communication (NFC), Bluetooth low energy (BLE), and ultra-wide band (UWB) communications functionality; and wherein the WCM is a radio frequency hub module (RFHM).

In addition to the foregoing, the described vehicle control system may include one or more of the following features: wherein the VAD further includes a motion sensor to detect motion of the VAD, wherein the WCD is a radio frequency (RF) device to communicate with the RFHM, and wherein the VAD is configured to perform the battery saving function by turning off the RF device to preserve VAD battery life when the motion sensor indicates the VAD is not in motion for the predetermined period of time; and wherein the WCM is configured to localize the VAD to thereby determine if the VAD is located (i) within an interior zone of the vehicle or (ii) within an exterior zone of the vehicle.

In addition to the foregoing, the described vehicle control system may include one or more of the following features: wherein the VAD further includes a motion sensor to detect motion of the VAD, wherein if the VAD is localized within the interior zone, the WCM is configured to send a first signal to command the VAD to disable the battery saving function, and wherein if the VAD is localized within the exterior zone, the WCM is configured to send a second signal to command the VAD to enable the battery saving function to preserve the VAD battery life; and wherein the WCM is triggered to localize the VAD after: (i) a last vehicle access point closure, (ii) a vehicle start button is pressed, and/or (iii) a vehicle theft alarm is armed.

In addition to the foregoing, the described vehicle control system may include one or more of the following features: wherein when the controller detects the VAD is within the predetermined range of the vehicle, the controller is further programmed to broadcast a detectable heartbeat signal at a set interval to the VAD; wherein the VAD further includes a motion sensor to detect motion of the VAD, wherein when the VAD detects the heartbeat signal, the VAD disables the battery saving function, and wherein when the VAD does not detect the heartbeat signal for a predetermined number of consecutive periods, the VAD enables the battery saving function.

In accordance with another example aspect of the invention, a vehicle control system to manage keyless entry functionality and communication of a vehicle is provided. In one example implementation, the vehicle control system includes a wireless control module (WCM) configured to be disposed within the vehicle and detect one or more vehicle access devices (VADs) associated with the vehicle and configured to provide one or more keyless entry functions. A digital key control module (DKCM) is in signal communication with the WCM, the DKCM configured to be disposed within the vehicle and detect one or more portable smart devices having a digital key configured to enable the portable smart device to function as a key for the vehicle. The WCM is configured to authenticate and range the one or more VADs, the DKCM is configured to authenticate and range the one or more portable smart devices, and the DKCM is configured to send a cyclic message to the WCM containing a list of the one or more portable smart devices detected by the DKCM. The WCM is configured to generate and populate a Proximity Matrix that indexes the VADs detected by the WCM and the portable smart devices detected by the DKCM, and the WCM is configured to manage the keyless entry functions of the vehicle based on the Proximity Matrix.

In addition to the foregoing, the described vehicle control system may include one or more of the following features: wherein the Proximity Matrix includes a key ID providing a unique ID to each of the detected VADs and portable smart devices, and a zone ID indicating a particular zone where each of the detected VADs and portable smart devices are located in relation to a proximity of the vehicle; and wherein the Proximity Matrix further includes a profile ID indicating a keyless entry permission of each of the detected VADs and portable smart devices.

In addition to the foregoing, the described vehicle control system may include one or more of the following features: wherein the keyless entry permission includes one of (i) no drive restrictions and (ii) vehicle access only, no drive permission; wherein the WCM includes a controller having one or more processors programmed to continuously update the Proximity Matrix based on the cyclic message from the DKCM; and a body control module (BCM) configured to receive one or more commands from the WCM to perform the keyless entry functions.

In accordance with yet another example aspect of the invention, a vehicle control system to manage keyless entry functionality and communication of a vehicle is provided. In one example implementation, the vehicle control system includes a wireless control module (WCM) configured to be disposed within the vehicle and control one or more keyless entry functions. A vehicle access device (VAD) provides keyless entry functionality to a user, the VAD including a battery powering a wireless communication device for communicating with the WCM, wherein the VAD includes a battery saving function configured to selectively deactivate the WCD to preserve battery power when no motion of the VAD is detected for a predetermined period of time. A digital key control module (DKCM) is in signal communication with the WCM, the DKCM configured to be disposed within the vehicle and detect one or more portable smart devices having a digital key configured to enable the portable smart device to function as a key for the vehicle.

A controller is associated with the WCM and includes one or more processors programmed to detect a presence of the VAD within a predetermined range of the vehicle, and selectively send a signal to the VAD to disable the battery saving function when the VAD is within the predetermined range of the vehicle. the WCM is configured to authenticate and range one or more VADs. The DKCM is configured to authenticate and range the one or more portable smart devices. The DKCM is configured to send a cyclic message to the WCM containing a list of the one or more portable smart devices detected by the DKCM. The WCM is configured to generate and populate a Proximity Matrix that indexes the VADs detected by the WCM and the portable smart devices detected by the DKCM. The WCM is configured to manage the keyless entry functions of the vehicle based on the Proximity Matrix.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 4 is a collection of tables illustrating example data utilized for a Proximity Matrix generated by the vehicle control system of FIG. 1, according to the principles of the present disclosure.

DESCRIPTION

Figure 1:
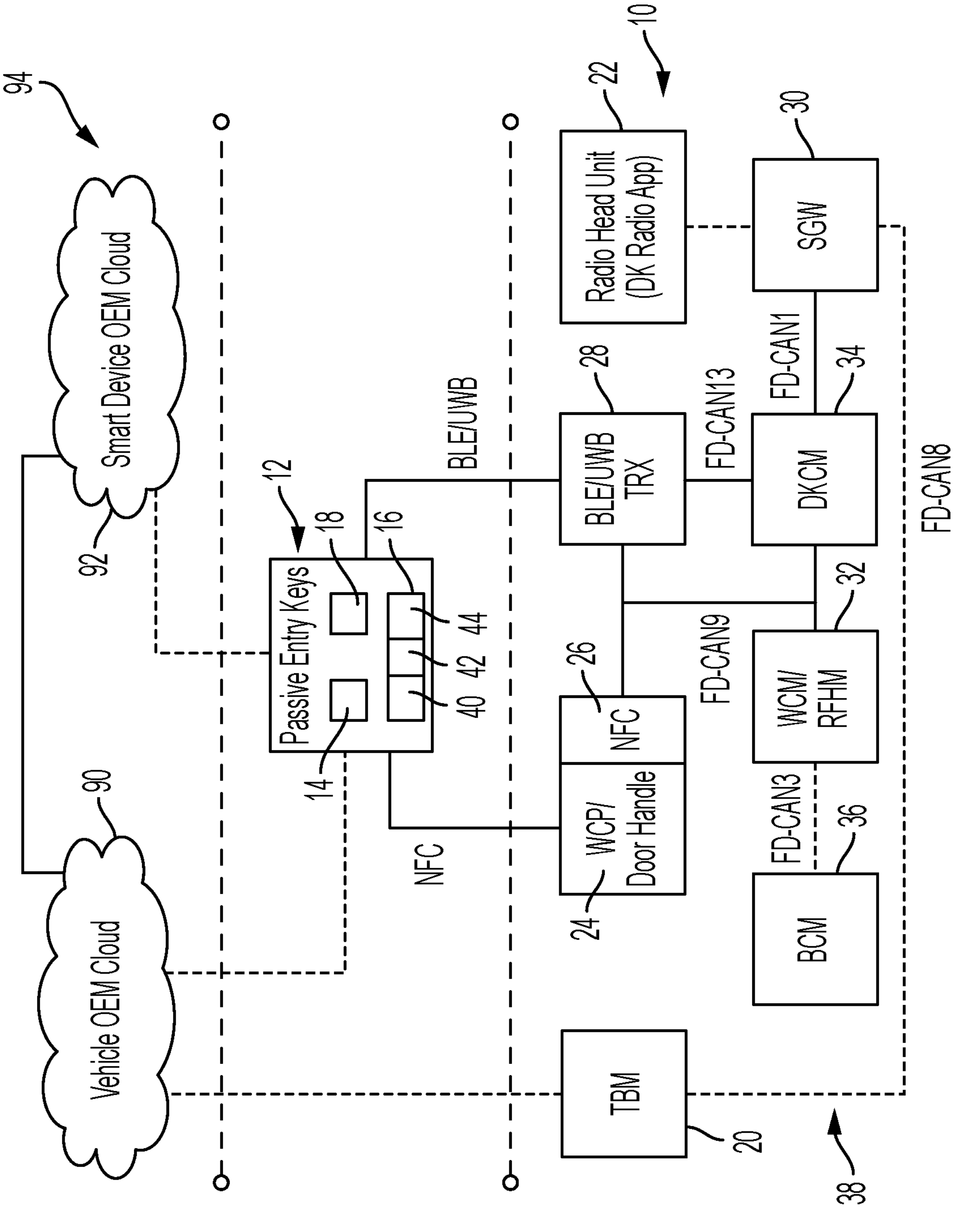
FIG. 1 is a functional block diagram of an example vehicle control system to manage passive entry function for a vehicle, according to the principles of the present disclosure.

As previously discussed, vehicles may include a passive entry/start system, which utilizes low frequency (LF) and/or ultra-high frequency (UHF) to allow the driver to enter and start the vehicle using a key fob. The system is passive because it does not require interaction with the key fob. The systems described herein additionally enable a smart device (e.g., smart phone, tablet, watch, etc.) to function as a key fob. This functionality utilizes near field communication (NFC), Bluetooth low energy (BLE), and ultra-wide band (UWB) technologies.

While legacy LF/UHF key fobs are managed using a dedicated electronic control unit (ECU), such as a radio frequency hub module (RFHM), the systems described herein include an additional component in the vehicle to manage the smart devices, referred to as a digital key control module (DKCM). Additionally, the systems described herein include a new key fob, referred to herein as a vehicle access device (VAD). In the example embodiment, the VAD utilizes NFC, BLE, and UWB wireless technology instead of LF/UHF.

However, compared to LF/UHF key fobs, the VAD has a higher power consumption since it is required to be in BLE advertising/connected state, even if the key fob is not being used. In addition, UWB ranging functions consume more energy compared to legacy LF/UHF ranging functions. To improve the VAD battery life, and mitigate certain security attacks (e.g., relay attack), a motion sensor is included to the VAD printed circuit board. The motion sensor is used to turn off the radio frequency (RF) components when the VAD is not in motion. However, if the user leaves the VAD in the vehicle interior for a long period, it may trigger the motion sensor to disable the VAD RF components, resulting in the disablement of the push start button to start vehicle feature. It may also disable a feature that prevents locking the VAD in the vehicle.

Accordingly, the systems and methods described herein address the issue of VAD RF disablement due to inactivity, as well as allow the vehicle to manage the connected smart devices and legacy key fobs together. To counter VAD RF disablement, the system provides two operations, an event-triggered function and a heartbeat-based function.

The event-triggered function provides the VAD with a 'disable command' and an 'enable command' that are sent from the vehicle to the VAD wirelessly (e.g., LF, BLE signal). If the VAD receives the disable command, it will disable (turn off) its motion sensor functionality. If the VAD receives the enable command, it will enable (turn on) its motion sensor functionality. A vehicle wireless control module (WCM), also referred to as the RFHM, is responsible for VAD localization and is configured to support the disable/enable commands. When the WCM localizes (e.g., identifies) the VAD in a vehicle interior zone, it sends the enable command to the VAD(s) localized in the vehicle interior zone. When the WCM localizes the VAD in a vehicle exterior zone, it sends the disable command to the VAD(s) localized in the vehicle exterior zone. In the example embodiment, VAD localization is triggered after a last vehicle access point closure (e.g., last door closure), pressing the START button (ignition), and vehicle theft alarm (VTA) arming.

The heartbeat-based function is configured such that when the vehicle detects a valid VAD is within a predefined vehicle proximity, the vehicle sends a heartbeat signal at a set interval (e.g., one minute). If the VAD detects the heartbeat signal, then the VAD motion sensor activation function is disabled (e.g., keep the RF enabled). In other words, the ability to deactivate/reactivate based on motion sensing is disabled. If the VAD does not receive the heartbeat signal for a predetermined number of consecutive time periods, then the VAD enables the motion sensor deactivation function (e.g., allows RF disable if there is no motion and reactivate upon motion). It will be appreciated that the event-triggered heartbeat-based functions may be used separately or concurrently.

Further, to support both legacy key fobs, as well as connected smart devices (e.g., digital keys), the DKCM is configured to transmit a cyclic message to the RFHM, which contains a list of connected smart devices that are detected by the DKCM. The RFHM is configured to support a Proximity Matrix, which includes a proximity matrix template with a key ID, a zone ID, and a profile ID. The various Key ID numbers are reserved for various types of devices (e.g., key fob, smart device, reserved for future use, etc.). The zone ID represents the zone where the smart device is detected, and the profile ID represents the access rights for each device (e.g., no drive restrictions, valet parking, access only—no driving).

The Proximity Matrix tracks the number of key fobs and smart devices for each zone and profile ID. To add a new key (e.g., key fob or smart device) to the Proximity Matrix, the sender (e.g., RFHM or SpaaK) is configured to assign Zone ID [0] as the previous zone ID. To remove an existing key from the Proximity Matrix, the senser is configured to assign Zone ID [0] as the current zone ID. In this way, the RFHM is configured to update the Proximity Matrix, based on the DCKM updates (cyclic messages), along with key fob search events. The RFHM is configured to use the Proximity Matrix to trigger the proximity wakeup function. In addition, the RFHM is configured to use the Proximity Matrix to manage the vehicle access and start functionalities.

With reference now to FIG. 1, an example schematic diagram of a vehicle control system is illustrated and generally identified at reference numeral 10. As previously described, the vehicle control system 10 is configured to manage keyless entry functionality, communication and/or battery preservation of a passive entry key (PEK) 12. In the example implementation, the PEK 12 encompasses one or more devices associated/authenticated/paired with the vehicle and configured for activating one or more passive entry features such as, for example, door unlock, vehicle start, etc. In the example embodiment, the PEK 12 may refer to a legacy key fob 14 (e.g., LF/UHF key fob), a vehicle access device (VAD) 16 (e.g., NFC/BLE/UWB key fob), or a portable smart device 18 (e.g., a smart phone, tablet, computer) with a digital key to enable function as a key for the vehicle.

As shown, the vehicle control system 10 and/or the PEK(s) 12 are configured to communicate with a vehicle OEM cloud 90 (e.g., secure server) and a smart device OEM cloud 92, which together define a communication system 94. The OEM clouds 90, 92 may be owned and operated by a particular original equipment manufacturer (OEM) and are only accessible to authorized users, such as a particular type or brand of vehicle/device.

In the example embodiment, the vehicle control system 10 generally includes a telematics box module (TBM) 20, a radio head unit 22, a wireless charging pad (WCP) and/or door handle 24 with a near field communicator (NFC) 26, a Bluetooth Low Energy (BLE)/ultra wide band (UWB) transceiver 28, a security gateway (SGW) 30, a wireless communication module (WCM) or radio frequency hub module (RFHM) 32, a digital key control module (DKCM) 34, and a body controller module (BCM) 36. The components of the vehicle control system 10 are in signal communication via a CAN communication bus 38, which includes various sub-buses (e.g., FD-CAN1) illustrated in FIG. 1.

In the example embodiment, the TBM module 20 is configured to function as a modem and is configured to provide cellular (or other) connectivity to the vehicle. For example, the TBM 20 is configured to function as a gateway for the RFHM 32. The radio head unit 22 is a vehicle center display controller that provides a human machine interface (HMI) for the access system. The wireless charging pad 24 is configured to communicate via a private LIN to the BCM 36, and via FD-CAN9 bus to the DKCM 34. The wireless charging pad 24 embeds an NFC transceiver, which provides communication capacity with smart devices via NFC technology. The door handle 24 includes capacitive sensors in signal communication with the RFHM 32 via the FD-CAN9 bus. The door handle NFC sensor 26 is in signal communication with the DKCM 34 via the FD-CAN9 bus. The PEK 12 may include an NFC key card and/or built-in NFC hardware (not shown) configured to communicate with the NFC sensors 26 in the wireless charging pad and the door handle 24.

The BLE/UWB transceiver 28 is configured to provide communication between the PEK 12 and the DKCM 34 via the FD-CAN13 bus. In addition, the BLE/UWB transceiver 28 provides wireless communication capability with smart devices via BLE/UWB technologies. The SGW 30 is configured to forward pre-provisioned and clean CAN messages from the TBM module 20 to the DKCM 34 via the FD-CAN1 bus, and the RFHM 32 via the FD-CAN3 bus. The SGW 30 is also in signal communication with the radio head unit 22. The RFHM 32 supports operational features of the vehicle and is in signal communication with vehicle modules via the FD-CAN3 bus. Additionally, the RFHM 32 is the master component for vehicle entry functions (e.g., lock, unlock, remote keyless entry (RKE), vehicle start, etc.).

In the example embodiment, the DKCM 34 functions as the digital key master and is configured to manage all digital key functions for vehicle access and start functionalities. The DKCM 34 may be configured to: (i) use the FD-CAN1 bus for diagnostic purposes, (ii) communicate with the SGW 30 and TBM 20 via the FD-CAN1 bus and FD-CAN8 bus, (iii) communicate with the BCM 36 via the FD-CAN1, (iv) communicate with the BLE/UWB transceiver 28 via the FD-CAN13 bus, and (v) communicate with the RFHM 32 via the FD-CAN9 bus.

In the example embodiment, the VAD 16 generally includes a wireless communication device (WCD) 40, a battery 42, and a motion sensor 44. The WCD 40 is a transceiver (e.g., RF transceiver) powered by the battery 42. The motion sensor 44 is in signal communication with the WCD 40 and is configured to sense motion of the VAD 16. Since constant operation of the WCD 40 consumes battery power, the VAD 16 is equipped with motion sensor activation/deactivation functionality, also referred to as a battery saving function, to preserve battery life. This function is configured to deactivate the WCD 40 when motion of the VAD 16 is not detected for a predetermined period of time, to thereby reduce power consumption. When motion of the VAD 16 is detected via sensor 44, the WCD 40 may then be reactivated.

However, this battery saving function may not be desirable when the VAD 16 is inside of the vehicle. For example, the WCD 40 may be deactivated while a driver is in the vehicle, which may then prevent the ability to passively start the vehicle with the VAD 16. Accordingly, to prevent unintended deactivation, the vehicle control system 10 is provided with two methods of operation. The first method is an event triggered function, shown in FIG. 2, and the second method is a heartbeat-based function, shown in FIG. 3.

Figure 2:
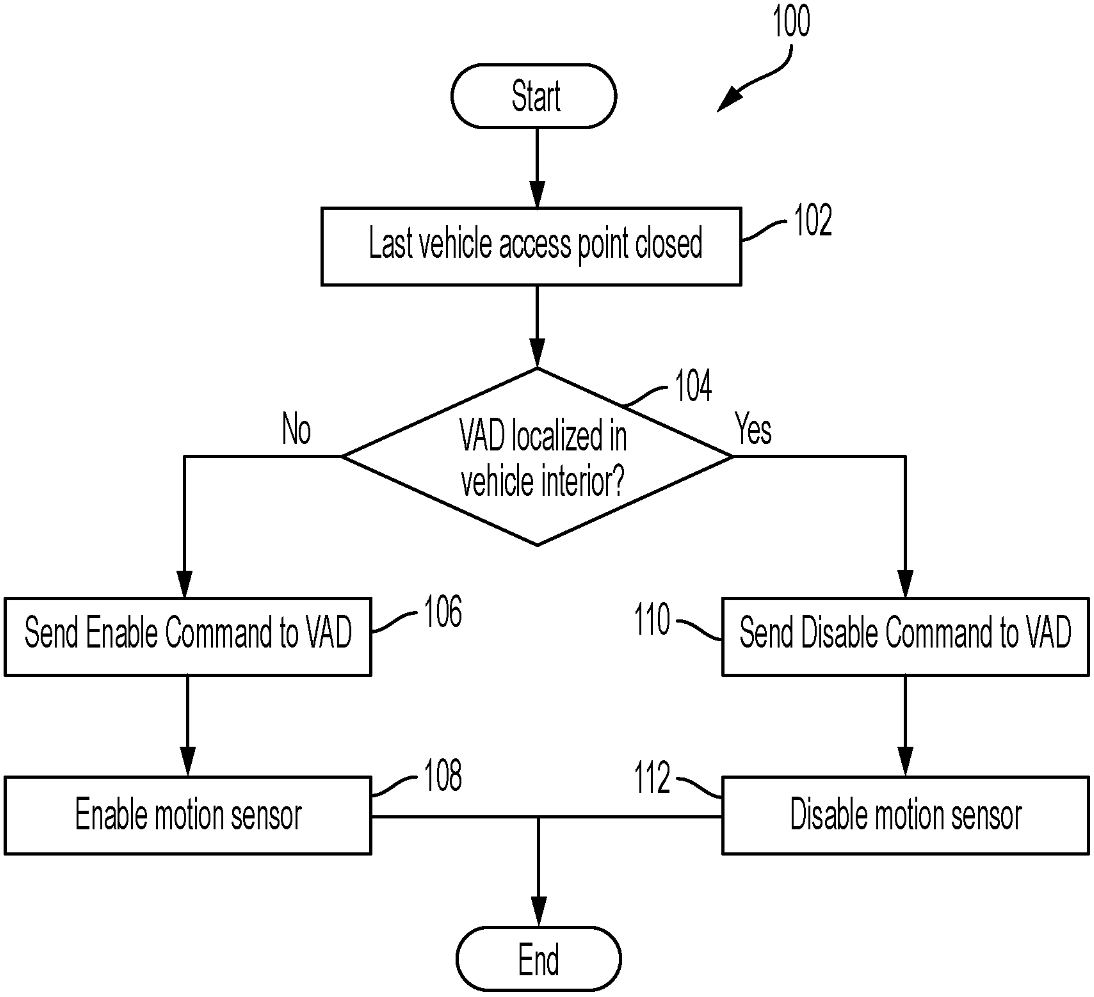
FIG. 2 is a flow diagram of an example method of operating the vehicle control system of FIG. 1, according to the principles of the present disclosure.

Referring now to FIG. 2, a flow diagram of an example method 100 of VAD battery power management using the event triggered function is illustrated according to the principles of the present disclosure. In the example embodiment, the VAD 16 supports a 'disable command' and an 'enable command' for the motion sensor based battery saving function. The disable command is configured to disable the battery saving function to prevent unintended deactivation, and the enable command is configured to enable the battery saving function to operate normally and preserve VAD battery life. In operation, the RFHM 32 is configured to localize (e.g., locate) the VAD 16 and subsequently issue the appropriate disable/enable command.

The method 100 begins at step 102 when the last vehicle access point is closed (e.g., the last door closure of the vehicle). This may be determined, for example, after last door closure, pressing the ignition start button, and/or arming of a vehicle theft alarm. At step 104, the RFHM 32 localizes the VAD 16 and determines if the VAD 16 is located within the vehicle interior. If the VAD 16 is not located within the vehicle interior (e.g., exterior to the vehicle), control proceeds to step 106 and the RFHM 32 sends the enable command to the VAD 16. At step 108, the VAD 16 then enables its motion sensor functionality. This allows the WCD 40 to deactivate when no motion is detected to thereby preserve battery life when the VAD 16 is outside of the vehicle. Control then ends or returns to step 102.

However, if the VAD 16 is located within the vehicle interior at step 104, control proceeds to step 110 and the RFHM 32 sends the disable command to the VAD 16. At step 112, the VAD 16 then disables its motion sensor functionality to prevent unwanted deactivation of the WCD 40 while the VAD 16 is in the vehicle. Control then ends or returns to step 102.

Figure 3:
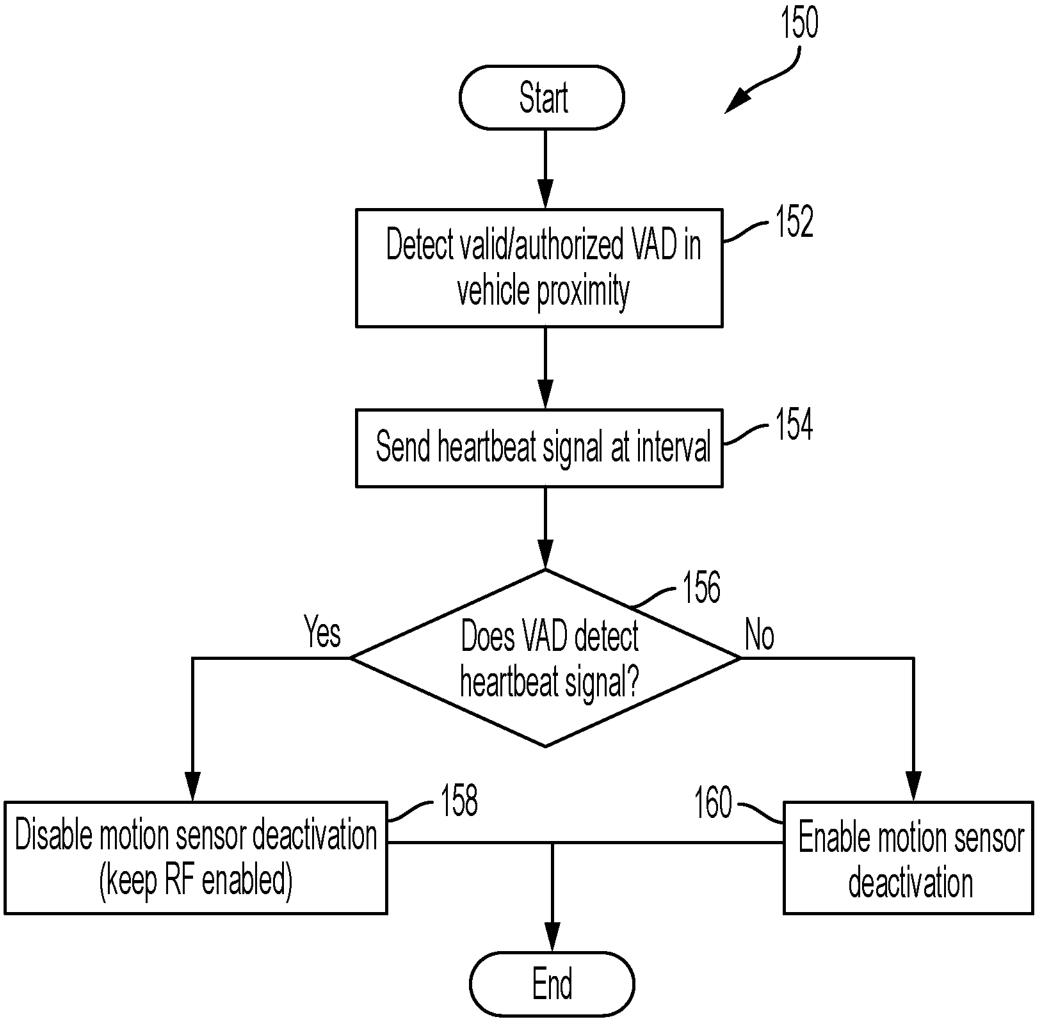
FIG. 3 is a flow diagram of another example method of operating the vehicle control system of FIG. 1, according to the principles of the present disclosure.

Referring now to FIG. 3, a flow diagram of an example method 150 of VAD battery power management using the heartbeat-based function is illustrated according to the principles of the present disclosure. In the example operation, the vehicle control system 10 is configured to detect the VAD 16 and subsequently emit a heartbeat signal (e.g., via a controller of WCM 32 or DKCM 34). If the VAD 16 detects the heartbeat signal, the VAD 16 disables its motion sensor based battery saving function to prevent unwanted deactivation of the WCD 40 while the VAD 16 is in/near the vehicle. If the VAD 16 does not detect the heartbeat signal (e.g., indicating the VAD is out of range of the vehicle), the VAD 16 enables its motion sensor functionality to preserve battery life.

In the example embodiment, the method begins at step 152 when the vehicle control system 10 detects a valid or authorized VAD 16 within a predefined proximity of the vehicle. This may be only within the vehicle interior or within a defined range of the vehicle. At step 154, the vehicle control system 10 subsequently sends a heartbeat signal at a preset interval (e.g., every minute). At step 156, the VAD 16 determines if the heartbeat signal is detected. If the heartbeat signal is detected, control proceeds to step 158. If not, control proceeds to step 160.

At step 158, if the VAD 16 detects the heartbeat signal, the VAD 16 then disables the motion sensor battery saving function (e.g., keeps the RF enabled). This prevents unwanted deactivation of the WCD 40 if there is no motion and the VAD 16 is inside the vehicle. At step 160, if the VAD 16 does not detect the heartbeat signal for 'x' consecutive periods, the VAD 16 then enables the battery saving function to allow the WCD 40 to deactivate when no motion is detected to thereby preserve battery life when the VAD 16 is outside of the vehicle. The WCD 40 may then be reactivated when motion is detected. Control then ends or returns to step 152.

With reference now to FIG. 4 and continued reference to FIG. 1, an example operation of vehicle control system 10 to manage a plurality of PEKs 12 is illustrated according to the principles of the present disclosure. In the example embodiment, the vehicle control system 10 is configured to support multiple key fobs and multiple smart devices. The RFHM 32 is configured to support/manage the legacy key fobs 14, and the DKCM 34 is configured to support/manage the VADs 16 and smart devices as keys 18. In this way, all PEKs 12 associated with the vehicle may be managed at the same time.

In operation, the DKCM 34 is configured to transmit a cyclic message to the RFHM 32, which contains a list of the devices detected by the DKCM 34. The RFHM 32 is configured to generate/support a Proximity Matrix 200, which is a table that includes a Key ID (column 202), a Previous Zone ID (column 204), a Current Zone ID (column 206), and a Profile ID (column 208).

With continued reference to FIG. 4, in the example embodiment, a Zone ID table 210 shows a correlation of ID numbers 212 and their associated Zone location 214. For example, ID #2 corresponds to a "Detection Zone, Exterior Left of the vehicle," while ID #7 corresponds to an "interior of the vehicle." IDs may also be reserved for future use. It will be appreciated that the Zone ID table 210 may have any number of IDs and predefined Zones. These Zone IDs are utilized to populate columns 204 and 206 in the Proximity Matrix 200.

FIG. 4 also illustrates an example Profile ID table 220 showing a correlation of ID numbers 222 and their associated Access Profile 224 and profile Description 226. For example, ID #0 corresponds to a 'Full' Access Profile without any drive restrictions, while ID #1 corresponds to an 'Access Only' Access Profile that only provides access to the vehicle and no drive permissions. It will be appreciated that the Profile ID table 220 may have any number of IDs, Access Profiles, and permissions associated therewith. These Profile IDs are utilized to populate column 208 in the Proximity Matrix 200.

During operation, the Proximity Matrix 200 tracks the individual key fobs/smart devices 18 for each Zone and the associated Profile ID. The RFHM 32 continuously updates the Proximity Matrix 200, based on the DKCM 34 cyclic messages and key fob search events. The RFHM 32 is also configured to utilize the Proximity Matrix 200 to trigger proximity wakeup functions, as well as manage the vehicle access and start functionalities of the passive entry system. In one example, wakeup functions refer to the features of which are enabled based on the key (e.g., key fob, smart device) proximity to the vehicle such as, for example, 'approach unlock' or 'walk away lock.'

Figure 5A:
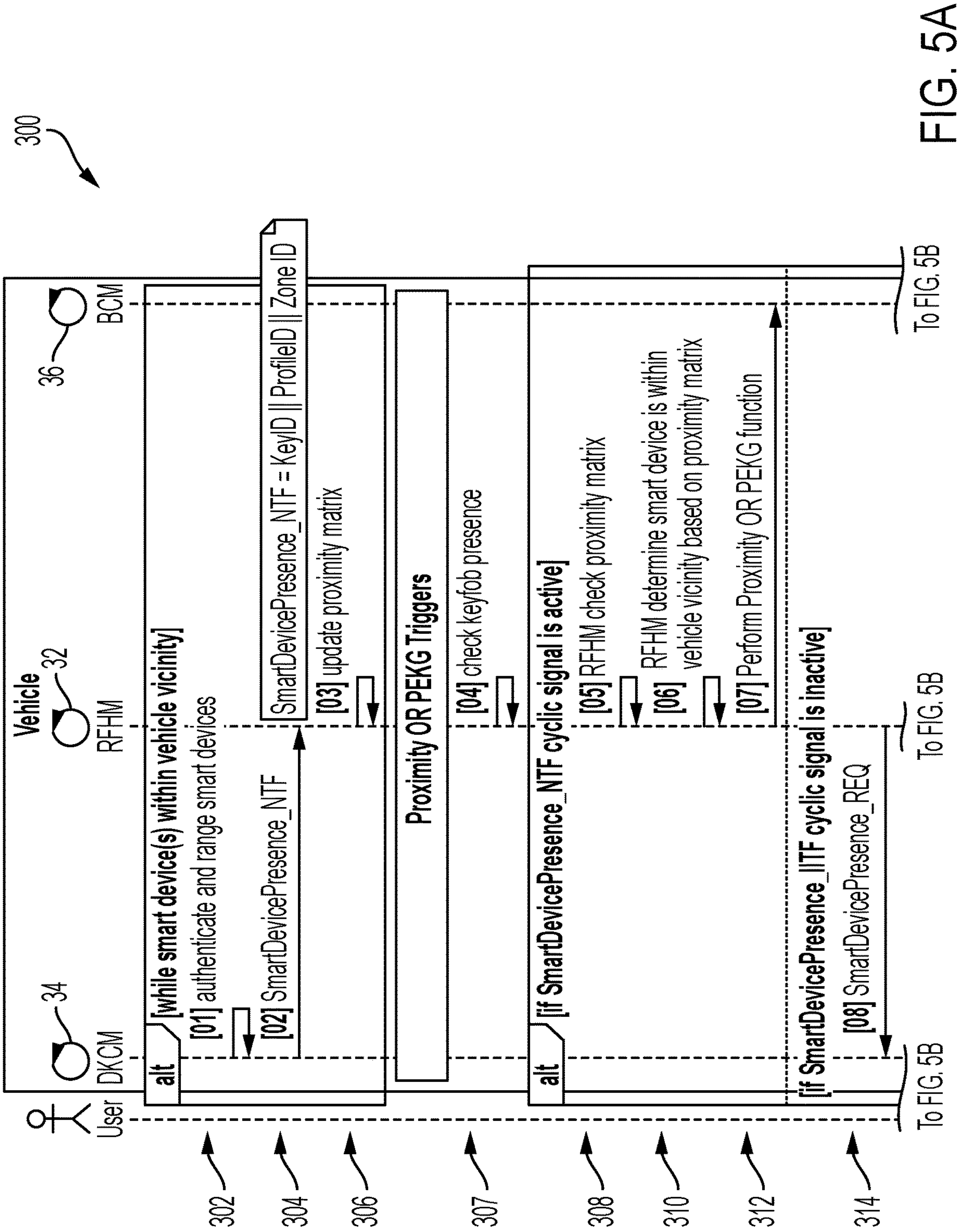
FIGS. 5A-5B illustrate a control diagram for an example operation of the vehicle control system of FIG. 1, according to the principles of the present disclosure.
Figure 5B:
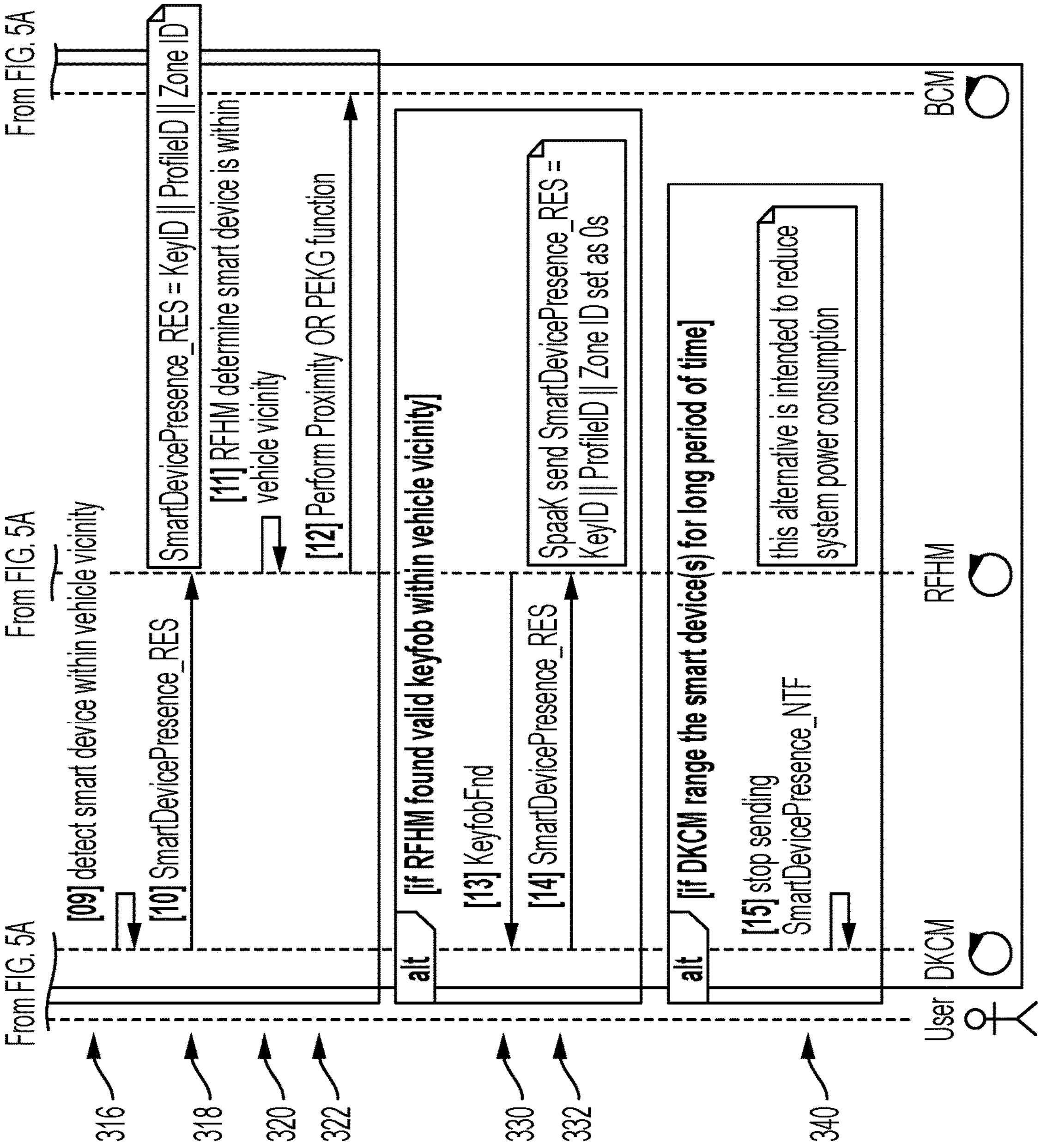

Referring now to FIGS. 5A-5B, an example control diagram 300 of the control operation described in FIG. 4 is illustrated according to the principles of the present disclosure. At 302, the DKCM 34 is configured to authenticate and range smart devices 18 while within the vehicle vicinity. At 304, the DKCM 34 sends a signal to the RFHM 32 indicating Key ID, Profile ID, and Zone ID for the detected smart devices 18. At 306, the RFHM 32 updates the Proximity Matrix 200 based on the signal from the DKCM 34.

At 307, the RFHM 32 checks for the presence of key fobs 14, 16. When the DKCM cyclic signal is active, at 308, the RFHM 32 checks the Proximity Matrix 200. At 310, the RFHM 32 confirms if a smart device key is within the vehicle vicinity based on the Proximity Matrix 200. At 312, the RFHM 32 performs the proximity or passive entry function (e.g., unlock doors) by sending a signal to the BCM 36.

When the DKCM cyclic signal is inactive, at 314, the RFHM 32 send a signal to the DKCM 34 requesting smart device presence. At 316, the DKCM 34 detects smart devices within the vehicle vicinity. At 318, the DKCM 34 sends a signal to the RFHM 32 indicating Key ID, Profile ID, and Zone ID for the detected smart devices 18. At 320, the RFHM 32 confirms if the smart device 18 is within the vehicle vicinity based on the Proximity Matrix 200. At 322, the RFHM 32 performs the proximity or passive entry function by sending a signal to the BCM 36.

At 330, if the RFHM 32 finds a valid key fob 14 or VAD 16, it sends a signal to the DKCM 34. At 332, the DKCM 34 sends a signal to the RFHM 32 indicating Key ID, Profile ID, and Zone ID for the detected key fobs 14/VADs 16.

At 340, if the DKCM 34 ranges the smart device(s) 12 for a predetermined length of time, the DKCM 34 ceases sending the smart device present signal to the RFHM 32 to reduce system power consumption.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A vehicle control system to manage keyless entry functionality and communication of a vehicle, the vehicle control system comprising:

a wireless control module (WCM) configured to be disposed within the vehicle and control one or more keyless entry functions;

a vehicle access device (VAD) to provide keyless entry functionality to a user, the VAD including a battery powering a wireless communication device (WCD) for communicating with the WCM, wherein the VAD is a key fob with a near field communicator (NFC), and a Bluetooth low energy (BLE) and ultra-wide band (UWB) transceiver for NFC, BLE and UWB communications functionality;

wherein the VAD includes a battery saving function configured to selectively deactivate the WCD to preserve battery power when no motion of the VAD is detected for a predetermined period of time; and a controller having one or more processors programmed to:

detect a presence of the VAD within a predetermined range of the vehicle; and selectively send a signal to the VAD to disable the battery saving function when the VAD is within the predetermined range of the vehicle.

2. The vehicle control system of claim 1, wherein the battery saving function is disabled to prevent an unintended deactivation of the WCD and thus the keyless entry functionality when the VAD is within an interior of the vehicle.

3. The vehicle control system of claim 1, wherein the WCM is a radio frequency hub module (RFHM).

4. The vehicle control system of claim 3, wherein the VAD further includes a motion sensor to detect motion of the VAD, wherein the WCD is a radio frequency (RF) device to communicate with the RFHM; and wherein the VAD is configured to perform the battery saving function by turning off the RF device to preserve VAD battery life when the motion sensor indicates the VAD is not in motion for the predetermined period of time.

5. The vehicle control system of claim 1, wherein the WCM is configured to localize the VAD to thereby determine if the VAD is located (i) within an interior zone of the vehicle or (ii) within an exterior zone of the vehicle.

6. The vehicle control system of claim 5, wherein the VAD further includes a motion sensor to detect motion of the VAD, wherein if the VAD is localized within the interior zone, the WCM is configured to send a first signal to command the VAD to disable the battery saving function, and wherein if the VAD is localized within the exterior zone, the WCM is configured to send a second signal to command the VAD to enable the battery saving function to preserve the VAD battery life.

7. The vehicle control system of claim 5, wherein the WCM is triggered to localize the VAD after: (i) a last vehicle access point closure, (ii) a vehicle start button is pressed, and/or (iii) a vehicle theft alarm is armed.

8. The vehicle control system of claim 1, wherein when the controller detects the VAD is within the predetermined range of the vehicle, the controller is further programmed to broadcast a detectable heartbeat signal at a set interval to the VAD.

9. The vehicle control system of claim 8, wherein the VAD further includes a motion sensor to detect motion of the VAD, wherein when the VAD detects the heartbeat signal, the VAD disables the battery saving function, and wherein when the VAD does not detect the heartbeat signal for a predetermined number of consecutive periods, the VAD enables the battery saving function.

10. A vehicle control system to manage keyless entry functionality and communication of a vehicle, the vehicle control system comprising:

a wireless control module (WCM) configured to be disposed within the vehicle and detect one or more vehicle access devices (VADs) associated with the vehicle and configured to provide one or more keyless entry functions;

a digital key control module (DKCM) in signal communication with the WCM, the DKCM configured to be disposed within the vehicle and detect one or more portable smart devices having a digital key configured to enable the portable smart device to function as a key for the vehicle, wherein the WCM is configured to authenticate and range the one or more VADs, wherein the DKCM is configured to authenticate and range the one or more portable smart devices, wherein the DKCM is configured to send a cyclic message to the WCM containing a list of the one or more portable smart devices detected by the DKCM, wherein the WCM is configured to generate and populate a Proximity Matrix that indexes the VADs detected by the WCM and the portable smart devices detected by the DKCM, and wherein the WCM is configured to manage the keyless entry functions of the vehicle based on the Proximity Matrix.

11. The vehicle control system of claim 10, wherein the Proximity Matrix includes:

a key ID providing a unique ID to each of the detected VADs and portable smart devices; and a zone ID indicating a particular zone where each of the detected VADs and portable smart devices are located in relation to a proximity of the vehicle.

12. The vehicle control system of claim 11, wherein the Proximity Matrix further includes:

a profile ID indicating a keyless entry permission of each of the detected VADs and portable smart devices.

13. The vehicle control system of claim 12, wherein the keyless entry permission includes one of (i) no drive restrictions and (ii) vehicle access only, no drive permission.

14. The vehicle control system of claim 10, wherein the WCM includes a controller having one or more processors programmed to continuously update the Proximity Matrix based on the cyclic message from the DKCM.

15. The vehicle control system of claim 14, further comprising a body control module (BCM) configured to receive one or more commands from the WCM to perform the keyless entry functions.

16. A vehicle control system to manage keyless entry functionality and communication of a vehicle, the vehicle control system comprising:

a wireless control module (WCM) configured to be disposed within the vehicle and control one or more keyless entry functions;

a vehicle access device (VAD) to provide keyless entry functionality to a user, the VAD including a battery powering a wireless communication device for communicating with the WCM, wherein the VAD includes a battery saving function configured to selectively deactivate the WCD to preserve battery power when no motion of the VAD is detected for a predetermined period of time;

a digital key control module (DKCM) in signal communication with the WCM, the DKCM configured to be disposed within the vehicle and detect one or more portable smart devices having a digital key configured to enable the portable smart device to function as a key for the vehicle; and a controller associated with the WCM, the controller having one or more processors programmed to:

detect a presence of the VAD within a predetermined range of the vehicle; and selectively send a signal to the VAD to disable the battery saving function when the VAD is within the predetermined range of the vehicle, wherein the WCM is configured to authenticate and range one or more VADs, wherein the DKCM is configured to authenticate and range the one or more portable smart devices, wherein the DKCM is configured to send a cyclic message to the WCM containing a list of the one or more portable smart devices detected by the DKCM, wherein the WCM is configured to generate and populate a Proximity Matrix that indexes the VADs detected by the WCM and the portable smart devices detected by the DKCM, and wherein the WCM is configured to manage the keyless entry functions of the vehicle based on the Proximity Matrix.

* * * * *